United States Patent [19]

Noren

[11] Patent Number: 5,303,597
[45] Date of Patent: Apr. 19, 1994

[54] METHOD AND DEVICE FOR MEASURING THE DENSITY OF A FLOWING FLUID

[76] Inventor: Anders Noren, Fafnervagen 30, Djursholm, S-182 65, Sweden

[21] Appl. No.: 82,555

[22] Filed: Jun. 28, 1993

Related U.S. Application Data

[63] Continuation-in-part of Ser. No. 689,841, filed as PCT/SE89/00701 Nov. 30, 1989, abandoned.

[30] Foreign Application Priority Data

Dec. 1, 1988 [SE] Sweden ............... 8804353-4

[51] Int. Cl.⁵ ................................................ G01F 1/00
[52] U.S. Cl. ................................. 73/861.35; 73/32 R
[58] Field of Search ............ 73/861.35, 861.77, 54.31, 73/32 R, 861.71, 867.87, 861.84, 59

[56] References Cited

U.S. PATENT DOCUMENTS

| | | | |
|---|---|---|---|
| 1,911,267 | 5/1930 | Danks | 73/861.88 |
| 2,076,816 | 4/1937 | Hess | 73/59 |
| 2,267,317 | 12/1941 | Veenschoten | 73/59 |
| 2,354,299 | 7/1944 | Bays | 73/59 |
| 3,426,595 | 2/1969 | Skelton | 73/861.81 |
| 3,710,622 | 1/1973 | Hammond et al. | 73/861.84 |
| 4,377,091 | 3/1983 | DeCarlo et al. | 73/861.87 |
| 4,773,253 | 9/1988 | Francisco, Jr. | 73/32 R |

*Primary Examiner*—Richard E. Chilcot, Jr.
*Assistant Examiner*—R. Biegel
*Attorney, Agent, or Firm*—Larson & Taylor

[57] ABSTRACT

A device for measuring the density of the fluid flowing in a closed passage includes a rotor whose speed of rotation is directly dependent on the rate of flow of the fluid. The rotor is connected to an activatable and deactivatable brake means which has an adjustable braking force. Depending on the setting of the brake means, the brake is operative to cause a greater or smaller lag in the rotary speed of the rotor in relation to an unbraked rotor or a rotor braked with a smaller force. The measuring means is operative to determine the resultant different rotational speeds of the rotor and the different in these speeds is a measurement of density.

12 Claims, 4 Drawing Sheets

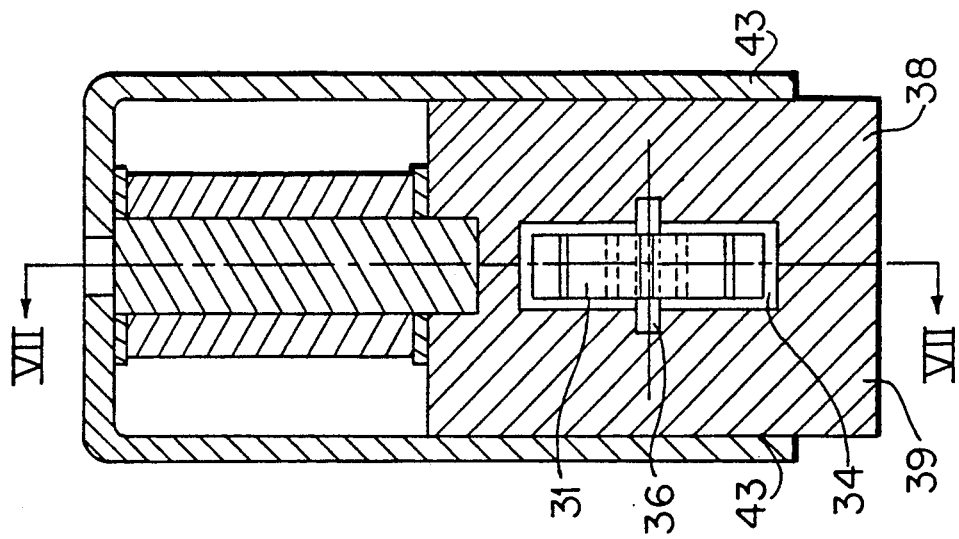
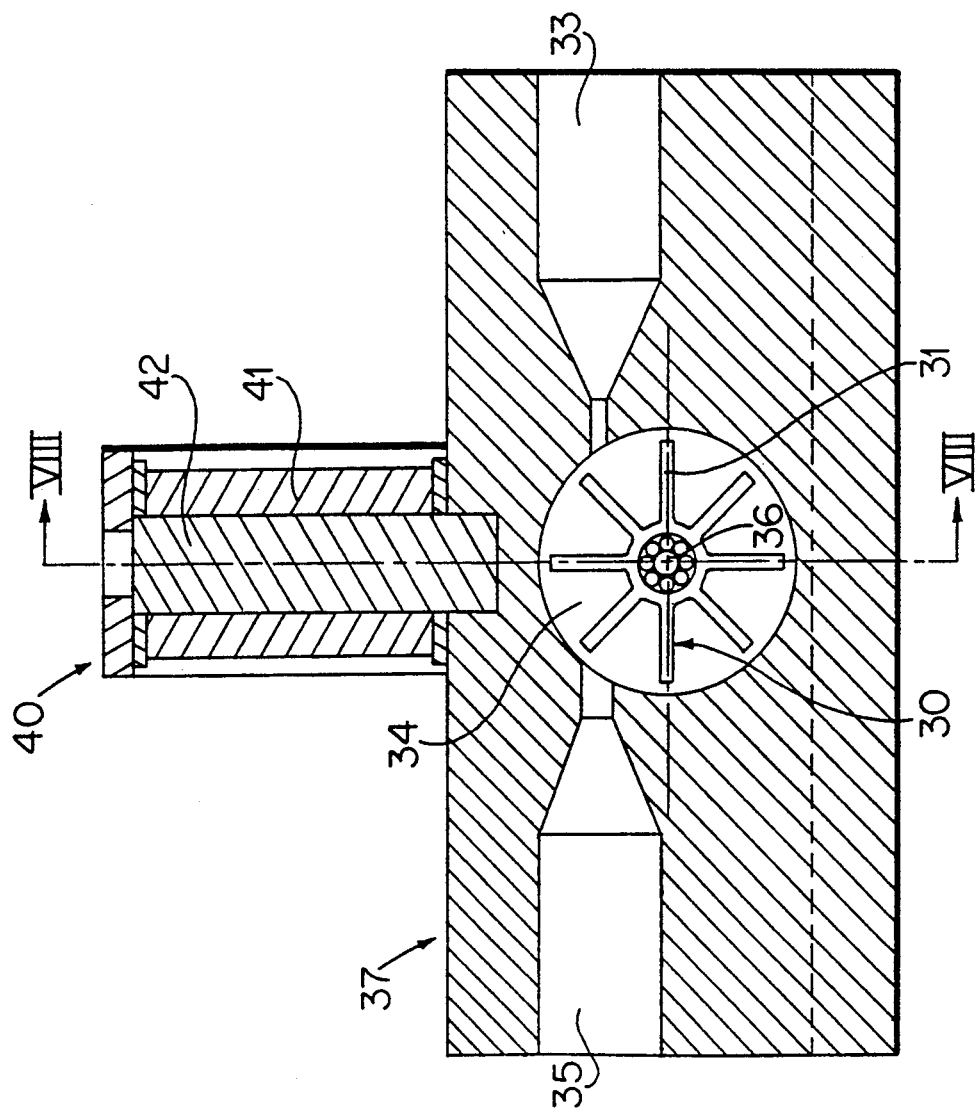

METHOD AND DEVICE FOR MEASURING THE DENSITY OF A FLOWING FLUID

This application is a continuation in part of co-pending appliation Ser. No. 07/689,841, filed as PCT/SE89/00701 Nov. 30, 1989, now abandoned.

The present invention relates to a method and to a device for measuring the density of a fluid flowing in a closed passage, the device comprising a rotor which is surrounded by the fluid and the speed of rotation of which is directly dependent on the flow rate of the fluid passing through the passage.

The object of the present invention is to provide a novel method and a novel device for measuring the density of a fluid flowing in a closed passage such as to enable such measurements to be made in a simpler fashion that has hitherto been possible. The invention is characterized in that the rotor is driven directly by the fluid and in that there is connected to the rotor a braking device which can be activated and deactivated and the braking force of which can be adjusted so that according to the braking force applied, the rotor will rotate at a slower speed, to a greater or lesser extent, in relation to an unbraked rotor or to a rotor which has been braked with a smaller braking force; and in that measuring means are provided for determining the resultant different speeds of rotation of the rotor, this difference in rotor speeds being a measurement of the density of the fluid.

In the case of one preferred embodiment of the inventive measuring device, the rotor is carried symmetrically by a shaft which extends substantially at right angles to the longitudinal axis of the fluid passage and the rotor shaft is positioned asymmetrically in relation to the longitudinal axis of said passage, and in which device the measuring means operative to determine the rotational speed of the rotor comprises at least one bore in the rotor which extends parallel with the rotor shaft and through which light is conducted from a light source arranged on one side of the rotor to a light-receiver arranged on the other side of the rotor. In a preferred embodiment, the braking device comprises an electromagnetic brake having a coil and magnetic poles.

The invention will now be described in more detail with reference to the accompanying drawings in which:

FIG. 7 is a longitudinal section view of a third embodiment of a density measuring device of the invention taken along line VII—VII of FIG. 8;

FIG. 8 is a cross-sectional view taken along line VIII—VIII of FIG. 7;

Figure 2:
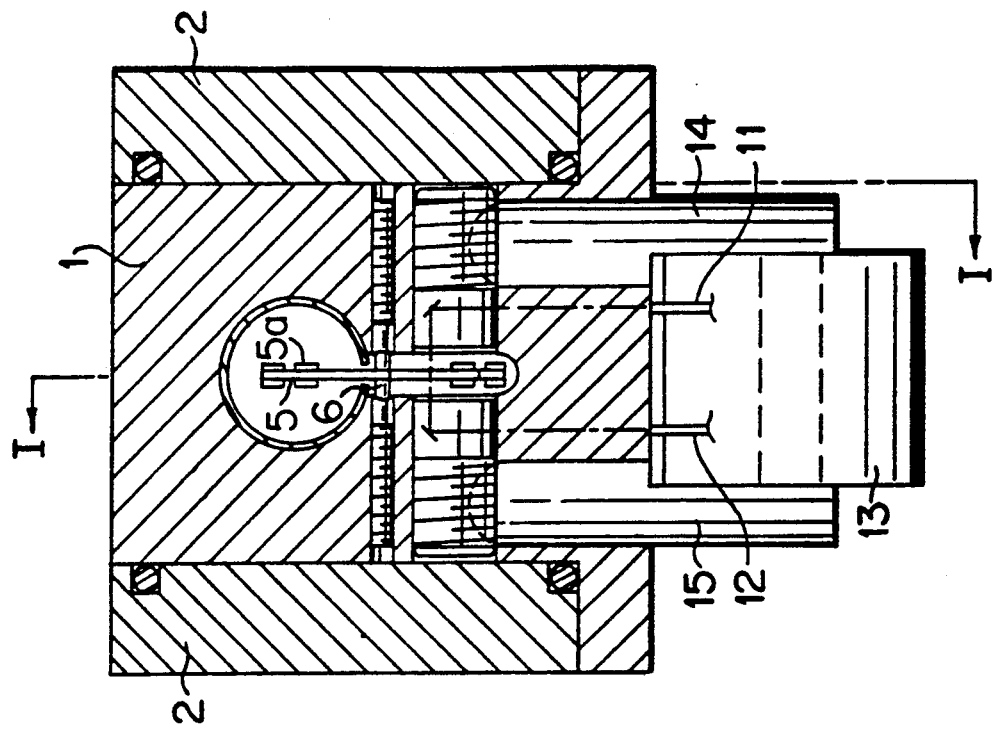
FIG. 2 is a cross-sectional view taken on the line II—II in FIG. 1.
Figure 1:
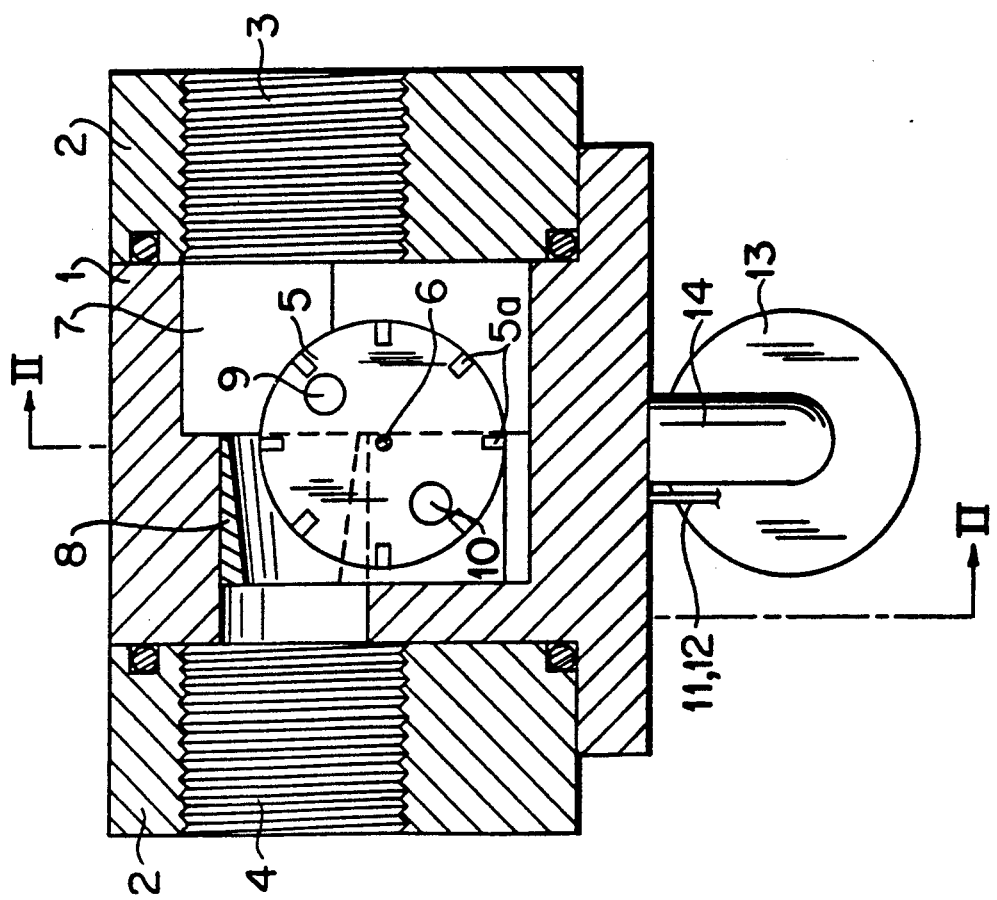
FIG. 1 is a longitudinal sectional view of a first embodiment of a density measuring device in accordance with the invention taken on the line I—I in FIG. 2.
Figure 3:
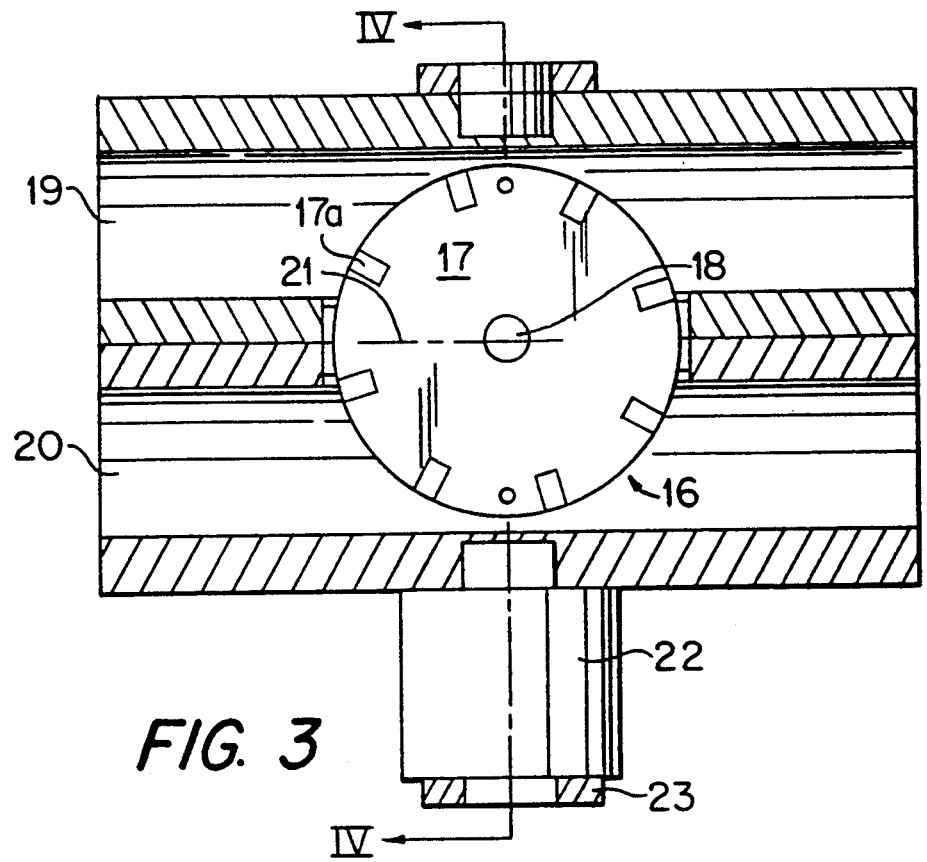
FIG. 3 is a longitudinal sectional view of a second embodiment of a density measuring device in accordance with the inventive device.
Figure 4:
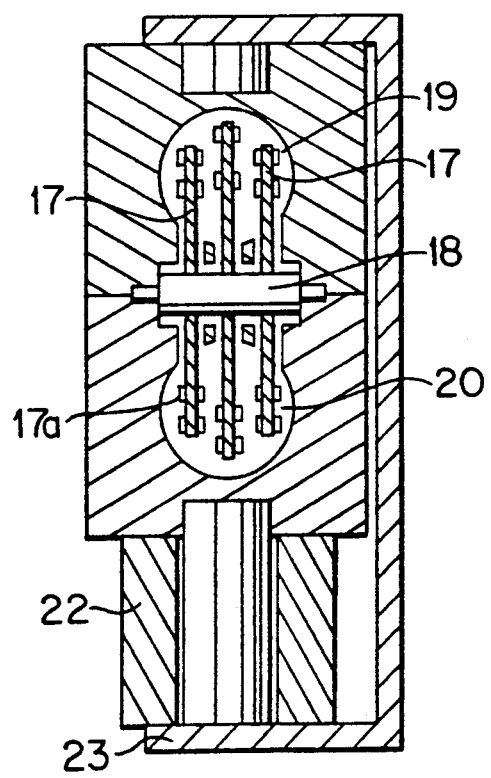
FIG. 4 is a cross-sectional view taken on the line IV—IV in FIG. 3.

In the embodiment illustrated in FIGS. 1 and 2, the body 1 of the measuring device is incorporated in a passage 2 having an inlet 3 and an outlet 4. The rotor of the device has the form of a circular impeller 5 which is journalled symmetrically on a shaft 6 which extends perpendicularly to the longitudinal axis of the passage 2. The impeller carries a plurality of substantially radially oriented impeller blades 5a. Impeller 5 is mounted in a space 7 in the body 1 which is located asymmetrically to the longitudinal axis of the passage 2. Located at the outlet of the space 7 leading to the outlet 4 of the passage is a flow-throttling nozzle 8. Impeller 5 has provided therein two bores 9 and 10 which extend parallel with the axis of impeller 5. These bores are operative to receive light from one light-conductor, e.g., light-conductor 11, and to conduct said light to another light-conductor, e.g., light-conductor 12. This will enable the rotational speed of impeller 5 to be measured on the basis of the time which passes between those time points at which light-conductor 12 receives light from light-conductor 11. Other types of rotor speed sensors may be employed such as devices which detect changes in electrical properties such as inductance.

The density meter has a brake device in the form of an eddy-current brake device comprising a coil 13 and two magnetic poles 14 and 15. As an alternative to an electromagnetic brake device, the inventive meter may be provided with a permanent-magnetic brake provided with adjustable magnets, or with a mechanical brake having force applying means.

Figure 5:
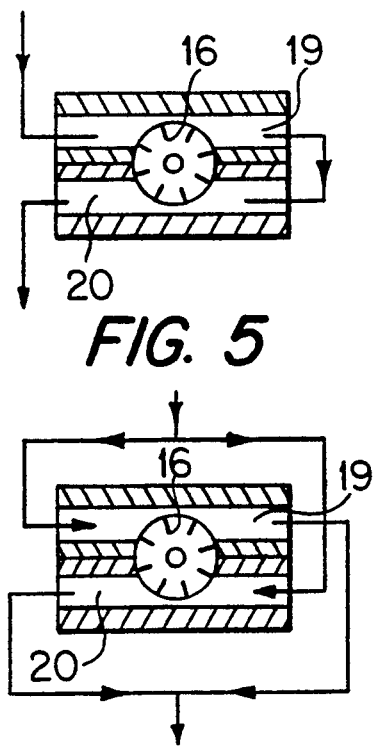
FIGS. 5 and 6 illustrate, in smaller scale, coupling of the device illustrated in FIGS. 3 and 4 in a fluid passage.
Figure 6:
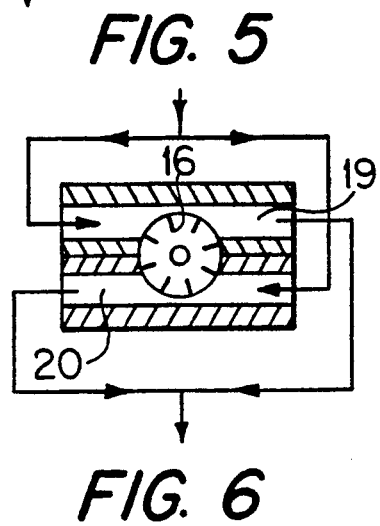

The embodiment of the meter illustrated in FIGS. 3, 4, 5, and 6 includes a rotor 16 which comprises three mutually parallel and circular impellers 17 journalled on a common shaft 18. Each impeller 17 carries a plurality of radially mounted blades 17a. The rotor 16 is mounted so as to lie in two mutually parallel conduits 19, 20 which are the mirror image of one another about an imaginary axis 21 passing through the center of the rotor 16. The rotor journals are fully relieved of the forces exerted by the fluid on the rotor, when the fluid flows in mutually opposite directions through the conduits 19, 20, as illustrated in FIGS. 5 and 6. In the FIG. 5 illustration, conduits 19, 20 are connected in series, whereas in the FIG. 6 illustration the conduits are connected in parallel. The brake device of this embodiment has the form of a hysteresis brake device having a coil 22 and magnetic poles 23.

In accordance with the invention, in the embodiment illustrated in FIGS. 1 and 2, the rotor 4 is connected to an activatable and deactivatable brake device 13, 14, 15, the braking force of which can be adjusted. The braking force exerted by the brake device is adjusted so that the rotor will rotate at a lower speed, to a greater or a lesser extent, than a rotor which is not braked or a rotor whose speed has been retarded with a smaller braking force. Thus, constant rotor speeds are determined and the density of the fluid calculated on the basis of the difference in these rotational speeds.

A paddle wheel or impeller driven by the liquid flowing from the inlet nozzle to the outlet opening is illustrated in the embodiment of FIGS. 7 and 8. Paddle wheel rotor 30 having a plurality of blades 31 is mounted for rotation in the fluid flow passage of the device. Fluid flows in a closed flow passage from inlet 33 through chamber 34 in which the rotor is mounted and through outlet 35. Fluid entering the device fills chamber 34 such that the rotor is surrounded by the fluid and such that the rotor is rotated by the fluid flowing in the flow passage, the speed of rotation of the rotor being directly dependent on the flow rate of the fluid in the passage. Rotor 30 is carried symmetrically by a shaft 36 which extends substantially at a right angle to the longitudinal axis of the passage, the rotor being located asymetrically in relation to the longitudinal axis of the passage so that when a fluid flows at constant velocity through the flow passage, the rotor will rotate at constant velocity. Rotor 30 is mounted in body 37 which is made up of two halves 38, 39 which are secured together by bolts or the like (not shown). Brake 40, mounted on body 37 as shown, includes coil 41, core 42, and poles 43. Rotor speed is directed by a suitable detector such as the light detector system described in connection with the embodiment of FIGS. 9 and 10, or an induction or other electrical type detector.

Figure 10:
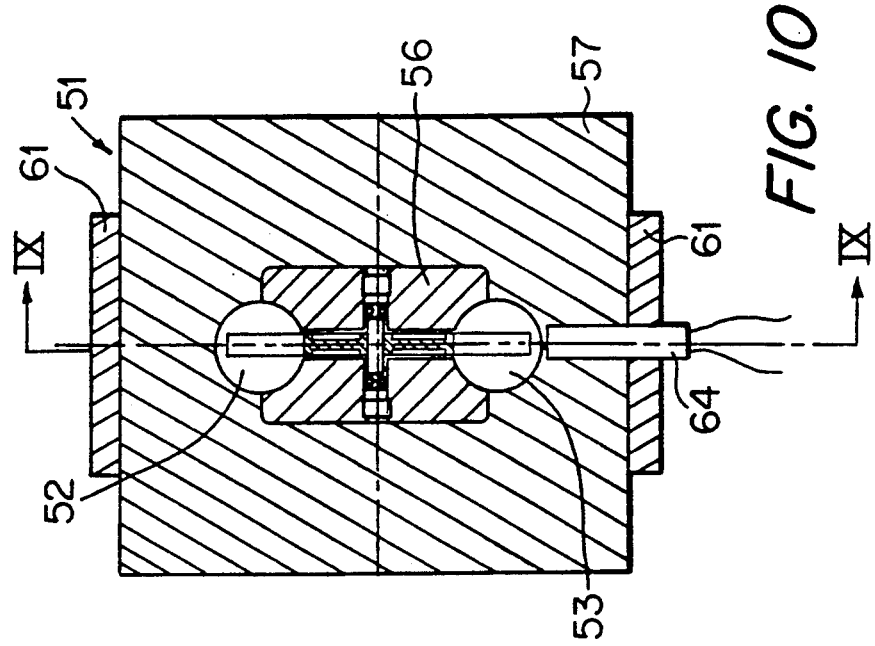
FIG. 10 is a cross-sectional view taken along line X—X of FIG. 9.
Figure 9:
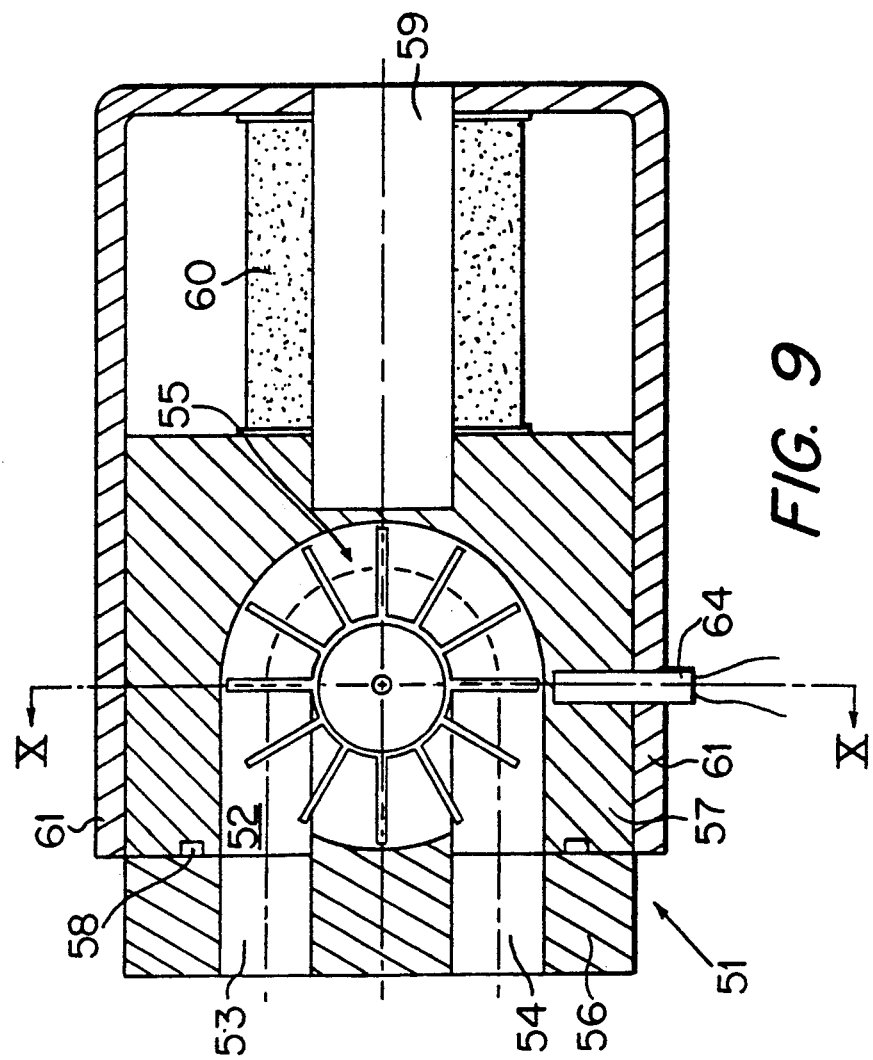
FIG. 9 is a longitudinal section view of a fourth embodiment of a density measuring device of the invention taken along line IX—IX of FIG. 10.

In the embodiment of FIGS. 9 and 10, paddle wheel 50 is mounted in a body 51 having a U-shaped fluid passage 52 with the rotor positioned at or near the bottom of the U. The fluid passage has a fluid inlet 53 along one leg of the U and a fluid outlet 54 along the other leg of the U and the fluid thus flows in opposite directions through the legs, thus relieving the rotor journals of forces exerted by the fluid on the rotor. The rotor is positioned symmetrically between the legs of the U-shaped passage such that the rotor extends symmetrically into the legs of the U-shaped passage similarly as in the embodiment of FIGS. 3 and 4, and the legs of the U are preferably mutually parallel. Preferably, the rotor is positioned at or near the bottom of the U-shaped passage such that the rotor is in contact with fluid along the full length of the curved bottom portion of the U-shaped flow path. The curved bottom portion 55 of the U-shaped flow path may be semi-circular in section as shown in FIG. 9 in which case it is preferred to mount the rotor such that the rotor and semi-circle are concentric as shown in FIG. 9. Body 51 is preferably made in two portions 56, 57. Rotor 50 is mounted for rotation in a slot in body portion 56. Body portion 56, with rotor 50 mounted therein as shown, is then inserted into a cavity in body portion 55 such that the rotor 50 is positioned in the device as shown. A sealing gasket 58 is provided between body portions 56 and 57 and the assembly is secured by bolts, not shown, which extend through holes (not shown) in body portion 56 into blind holes (not shown) in body portion 57. The device is provided with a magnetic brake comprising iron core 59, coil 60, and poles 61. Rotational speed of rotor 30 is conveniently detected by speed sensor 64 which is provided with a first fiber optic element which transmits light onto the tips of the blades of rotor 50 and with a second fiber optic element which detects light reflected from the blade tips. The blade tips may be polished or provided with reflectors to enhance reflection.

The measuring device of the invention is not limited to the aforedescribed, preferred embodiments, and modifications are possible within the scope of the claims. For instance, the brake device may have the form of a magnetic brake of the eddy-current or hysteresis type, comprising a displaceable permanent magnet and a brake-rotor of ferromagnetic material when the brake device is of the hysteresis kind, and of nonferromagnetic material when the brake device is of the eddy-current kind. The brake device may also comprise a displaceable, positionally adjustable, permanent magnet and may then be provided with a push rod provided with a knob for manually activating and deactivating the magnetic field.

Other rotors than the rotors illustrated in the drawings are also conceivable, such as an axial rotor or a cylindrical screw rotor in which the helix is symmetrically composed with right and left screws for the purpose of balancing axial forces.

Another conceivable type of meter is one in which the rotor has the form of a turbine wheel and the brake device comprises electromagnets or permanent magnets provided with displaceable pole shoes. A meter of this configuration, in combination with volumetric-flow measurement, is able to indicate mass flow with the aid of a simple arithmetic operation. Such a meter is of particular benefit when measuring gas flows in which the density can vary radically as a result of the pronounced influence of pressure and temperature on the density of gases. When the driving forces are small because density is low, it has been established that a signficiant lag in rotor speed is obtained with moderate magnetic fields. Consequently, the magnetic poles may be inserted into a bore provided in the casing, without needing to penetrate the channel wall. This reduces the risk of leakage to insignificant values. A simple construction can be achieved by using a one-sided horseshoe-type magnet which can be pushed in and out.

The device may be constructed so that during a measuring process the rotor will constantly rotate at mutually the same speed when no load is on the rotor, by providing an adjustable constriction or a fixed constriction upstream or downstream of the meter, so as to maintain the prescribed rotor speed. The reduction in rotor speed caused by braking can then be read directly as the density indicated by appropriate graduation of a speed scale.

The measuring means incorporated in the inventive device can be connected to a microprocesser provided with an LCD-display.

The measuring means may include a graduated scale which discloses how close to the rotor the permanent magnet must be brought in order to achieve a given lag in rotor speed.

Although the invention has been described in the foregoing with reference to several embodiments thereof, it will be understood that other embodiments can also be realized within the scope of the invention as defined in the following claims.

What is claimed is:

1. A method of determining the density of a fluid flowing in a closed passage which comprises:
   (a) providing a bladed rotor in said passage such that the rotor is surrounded by the fluid in said passage and such that the rotor is rotated by a fluid flowing in said passage, the speed of rotation of the rotor being directly dependent on the flow rate of the fluid in the passage so that when a fluid flows at constant velocity through the flow passage, the rotor will rotate at constant velocity;
   (b) causing a fluid to flow through said passage at an initial constant velocity to cause the rotor to rotate at an initial constant velocity;
   (c) applying a predetermined braking force to the rotor to cause the rotor to rotate at a constant velocity which is reduced in relation to the initial constant velocity; and
   (d) determining, from the difference between the initial and reduced constant velocities of the rotor, the density of said fluid.

2. A method according to claim 1 wherein the rotor is unbraked during step (b).

3. A method according to claim 1 wherein the rotor is braked during step (b) by a braking force which is less than the braking force applied during step (c).

4. A method according to claim 1 wherein the rotor is carried asymmetrically by a shaft which extends substantially at right angles to the longitudinal axis of the passage, said rotor shaft being located asymmetrically in relation to the longitudinal axis of said passage.

5. A method according to claim 1 wherein the rotor lies in two mutually parallel passages which are the mirror images of one another around a longitudinal axis passing through the center of the rotor and wherein the direction of fluid flow in one of the passages is opposite to the direction of fluid flow in the other passage.

6. A device for determining the density of a fluid flowing in a closed passage, said device comprising:

a bladed rotor mounted for rotation in said flow passage such that, in use of the device, the rotor is surrounded by the fluid and such that the rotor is rotated by a fluid flowing in said passage, the speed of rotation of the rotor being directly dependent on the flow rate of the fluid in the passage, said rotor being carried symmetrically by a shaft which extends substantially at right angles to the longitudinal axis of the passage, said rotor shaft being located asymmetrically in relation to the longitudinal axis of said passage so that when a fluid flows at constant velocity through the flow passage the rotor will rotate at constant velocity;

brake means for applying a braking force to the rotor, the braking force being sufficient to cause the rotor to rotate at a reduced constant speed in relation to the constant speed of an unbraked rotor or of a rotor braked with a smaller braking force;

rotational speed measuring means for measuring the initial and reduced constant rotational speeds of the rotor, a difference in said constant rotational speeds being representative of the density of the fluid.

7. A device according to claim 6 wherein said brake means comprises an electromagnetic brake comprising a coil and magnetic poles.

8. A device according to claim 6, wherein the rotor lies in mutually parallel passages.

9. A device according to claim 8 wherein said passages are the mirror images of one another around a longitudinal axis passing through the center of the rotor.

10. A device according to claim 6, wherein the rotational speed measuring means comprises light receiver means.

11. A device according to claim 7, wherein said electromagnetic brake is of the eddy-current type.

12. A device according to claim 7, wherein said electromagnetic brake is of the hysteresis type.

* * * * *